United States Patent [19]

Gutierrez et al.

[11] Patent Number: 5,238,466
[45] Date of Patent: * Aug. 24, 1993

[54] FUEL ADDITIVES DERIVED FROM AMIDO-AMINES

[75] Inventors: Antonio Gutierrez, Mercerville; Robert D. Lundberg, Bridgewater, both of N.J.

[73] Assignee: Exxon Chemical Patents Inc., Linden, N.J.

[ * ] Notice: The portion of the term of this patent subsequent to Aug. 15, 2006 has been disclaimed.

[21] Appl. No.: 730,336

[22] Filed: Jul. 15, 1991

Related U.S. Application Data

[60] Division of Ser. No. 358,731, May 30, 1989, Pat. No. 5,034,018, which is a continuation-in-part of Ser. No. 126,405, Nov. 30, 1987, Pat. No. 4,857,217, which is a continuation-in-part of Ser. No. 178,099, Apr. 6, 1988, Pat. No. 4,963,275, which is a continuation-in-part of Ser. No. 269,461, Nov. 10, 1988, Pat. No. 4,956,107, which is a continuation-in-part of Ser. No. 916,218, Oct. 7, 1986, abandoned.

[51] Int. Cl.$^5$ ............................. C10L 1/18; C10L 1/22
[52] U.S. Cl. ........................................ 44/331; 252/47; 252/51.5 A; 554/57
[58] Field of Search .............. 44/331; 260/404.8, 401, 260/399; 252/47, 51.5 A

[56] References Cited

U.S. PATENT DOCUMENTS

| | | | |
|---|---|---|---|
| 3,169,945 | 2/1965 | Hostettler et al. | 528/355 |
| 3,417,140 | 12/1968 | McWhorter et al. | 260/561 |
| 3,445,441 | 5/1969 | Rushton | 260/89.5 |
| 3,630,902 | 12/1971 | Coupland et al. | 252/51 A |
| 4,234,435 | 11/1980 | Meinhardt et al. | 252/51.5 A |
| 4,614,603 | 9/1986 | Wollenberg | 252/51.5 A |
| 4,857,217 | 8/1989 | Gutierrez et al. | 252/47 |
| 4,956,107 | 9/1990 | Gutierrez et al. | 252/47 |
| 4,963,275 | 10/1990 | Gutierrez et al. | 252/47.5 |
| 5,034,018 | 7/1991 | Gutierrez et al. | 44/383 |

FOREIGN PATENT DOCUMENTS

| | | |
|---|---|---|
| 0043934 | 1/1982 | European Pat. Off. |
| 0113582 | 7/1984 | European Pat. Off. |
| 0136185 | 4/1985 | European Pat. Off. |
| 0208560 | 1/1987 | European Pat. Off. |
| 0319229 | 6/1989 | European Pat. Off. |
| 0336664 | 10/1989 | European Pat. Off. |
| 1545296 | 11/1964 | Fed. Rep. of Germany. |
| WO85/03504 | 8/1985 | PCT Int'l Appl. |
| 1054370 | 1/1967 | United Kingdom. |

*Primary Examiner*—Jacqueline V. Howard
*Attorney, Agent, or Firm*—Robert A. Maggio

[57] ABSTRACT

The present invention is directed to a fuel additive comprising at least one adduct of (A) a polyolefin of 300 to 10,000 number average molecular weight substituted with at least 0.3 (e.g., from about 1 to 4) mono- or dicarboxylic acid producing moieties (preferably acid or anhydride moieties) per polyolefin molecule, (B) an amido-amine or thioamido-amine characterized by being a reaction product of at least a polyamine and an alpha, beta-unsaturated compound of the formula:

$$R^1-\underset{\underset{R^2}{|}}{C}=\underset{\underset{R^3}{|}}{C}-\underset{\underset{X}{\|}}{C}-Y$$

wherein X is sulfur or oxygen, Y is —OR$^4$, —SR$^4$, or —NR$^4$(R$^5$), and R$^1$, R$^2$, R$^3$, R$^4$ and R$^5$ are the same or different and are hydrogen or substituted or unsubstituted hydrocarbyl.

9 Claims, No Drawings

FUEL ADDITIVES DERIVED FROM AMIDO-AMINES

This is a continuation of application Ser. No. 358,731, filed May 30, 1989 now U.S. Pat. No. 5,034,018, which is a continuation-in-part of Ser. No. 07/126,405, filed Nov. 30, 1987, now U.S. Pat. No. 4,857,217, which is a continuation-in-part of Ser. No. 07/178,099 filed Apr. 6, 1988, now U.S. Pat. No. 4,963,275, which is a continuation-in-part of 07/269,461, filed Nov. 10, 1988, now U.S. Pat. No. 4,956,107, which is a continuation-in-part of Ser. No. 06/916,218, filed Oct. 7, 1986 now abandoned.

FIELD OF THE INVENTION

This invention relates to improved oil soluble dispersant additives useful in fuel compositions, and to concentrates containing said additives.

BACKGROUND OF THE INVENTION

U.S. Pat. No. 2,921,085 relates to the preparation of beta-aminopropionamides by reaction of an alkyl amine with an acrylate to form an alkyl aminopropionate and reaction of the latter compound with an amine. The resulting compounds are disclosed to have utility as surface active agents, specifically as emulsifying, wetting, foaming and detergent agents U.S. Pat. No. 3,337,609 relates to adducts of hydroxyalkyl alkylene polyamines and acrylates. The resulting adducts are added to polyepoxides to provide compositions which are suitable for use as a barrier coating for polyethylene surfaces, and for additional end uses, such as in molding. In addition, the adducts are disclosed to be useful as catalysts in resin preparation and as corrosion inhibitors in water systems for ferrous metals.

U.S. Pat. No. 3,417,140 relates to the preparation of amido-amine compositions, which are useful as epoxy resin curing agents, by reacting a polyalkylene polyamine and a fatty amine (comprising a mono- or diamine having as one of the substituents on a nitrogen atom a hydrocarbyl radical having 8 to 24 carbon atoms) with an alpha-beta unsaturated carbonylic compound. It is disclosed that this reaction occurs through the Michael addition of an amine group across the unsaturated group of the carbonylic compound and through the condensation of an amine group with the carbonylic group.

U.S. Pat. No. 3,247,163 also relates to curing agents for polyepoxide compositions, which curing agents are prepared by reacting an organic amine and an acrylate.

U.S. Pat. No. 3,445,441 relates to amino-amido polymers characterized by being a reaction product of at least a polyamine and an acrylate type compound, such as methyl or ethyl acrylate, and methyl or ethyl methacrylate. The patent states that the polymers are useful in a wide variety of applications, such as flocculating agents, water clarifying additives, corrosion inhibitors in oil and gas wells, and as lube oil additives. The patent further discloses that the polymers may be derivitized, including acylation with monocarboxylic acids and polycarboxylic acids, aliphatic dicarboxylic acids, aromatic dicarboxylic acids, for example, diglycolic, phthalic, succinic, etc., acids.

U.S. Pat. No. 3,903,003 relates to lubricating compositions containing an amido-amine reaction product of a terminally carboxylated isoprene polymer which is formed by reacting a terminally carboxylated substantially completely hydrogenated polyisoprene having an average molecular weight between about 20,000 and 250,000 and a nitrogen compound of the group consisting of polyalkylene amines and hydroxyl polyalkylene amines.

U.S. Pat. No. 4,493,771 relates to scale inhibiting with compounds containing quaternary ammonium and methylene phosphonic acid groups. These compounds are derivatives of polyamines in which the amine hydrogens have been substituted with both methylene phosphonic acid groups or their salts and hydroxypropyl quaternary ammonium halide groups. The patent discloses that any amine that contains reactive amino hydrogens can be utilized, for example, polyglycol amines, amido-amines, oxyacylated amines, and others.

U.S. Pat. No. 4,459,241 contains a similar disclosure to U.S. Pat. No. 4,493,771.

SUMMARY OF THE INVENTION

In one embodiment, the present invention is directed to a dispersant fuel additive comprising at least one adduct of (A) an amido-amine characterized by being a reaction product of at least a polyamine and an alpha, beta unsaturated compound of the formula:

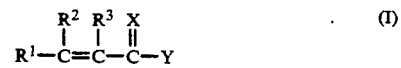

$$R^1 - \underset{\underset{R^2}{|}}{C} = \underset{\underset{R^3}{|}}{C} - \underset{\underset{X}{\|}}{C} - Y \qquad (I)$$

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl, and (B) a polyolefin of 300 to 10,000 number average molecular weight substituted with at least 0.3 (e.g., from about 1 to 4) mono- or dicarboxylic acid producing moieties (preferably acid or anhydride moieties) per polyolefin molecule.

The materials of the invention are different from the prior art because of their effectiveness and their ability to provide enhanced dispersancy. In crankcase lubricating oils, these additives have proven their ability to provide surprising enhanced performance as judged by the commercial 5E gasoline engine performance test. In fuels, the additives serve to minimize the degree of carburetor and fuel injector fouling from deposits.

Therefore, the present invention is also directed to novel processes for preparing the dispersant fuel adducts of this invention.

DETAILED DESCRIPTION OF THE INVENTION

PREPARATION OF AMIDO-AMINE REACTANT A

As described above, the amido-amine comprises a reaction product of at least a polyamine and an alpha, beta ethylenically unsaturated compound of formula (I) above.

The polyamines useful in this invention comprise polyamines, most preferably polyalkylene polyamines, of about 2 to 60, preferably 2 to 40 (e.g. 3 to 20), total carbon atoms and about 2 to 12, preferably 3 to 12, and most preferably at least 5 (e.g., 5 to 9) nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

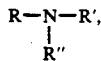
(II)

and

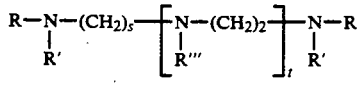
(III)

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

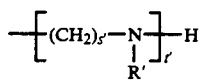
(IV)

wherein R' is as defined above, and wherein s and s' can be the same or a different number of from 2 to 6, preferably 2 the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t and t' be selected in a manner sufficient to provide the compounds of Formulas II and III with typically at least one primary or secondary amine group, preferably at least two primary or secondary amine groups. This can be achieved by selecting at least one of said R, R', R" or R''' groups to be hydrogen or by letting t in Formula III be at least one when R''' is H or when the IV moiety possesses a secondary amino group. The most preferred amine of the above formulas are represented by Formula III and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (V):

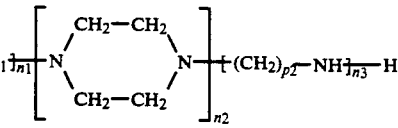

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

(VI)

where m has a value of about 3 to 70 and preferably 10 to 35; and

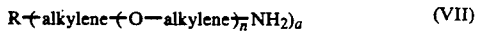
(VII)

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (VI) or (VII) may be straight or branched chains containing about 2 to 7, and preferably about 2 to 4 carbon atoms.

The polyoxyalkylene polyamines of formulas (VI) or (VII) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

Thus, any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula I, or with the thiocarbonyl group (—C(S)—) of the thioacrylate-type compound of formula I.

The alpha, beta ethylenically unsaturated compounds employed in this invention comprise at least one member selected from the group consisting of alpha, beta ethylenically unsaturated compounds of the formula $$R^1-\underset{\underset{R^2}{|}}{C}=\underset{\underset{R^3}{|}}{C}-\underset{\underset{X}{\|}}{C}-Y \quad (I)$$

wherein X is sulfur or oxygen, Y is —$OR^4$, —$SR^4$, or —$NR^4(R^5)$, and $R^1$, $R^2$, $R^3$, $R^4$ and $R^5$ are the same or different and are hydrogen or substituted or unsubstituted hydrocarbyl.

When $R^1$, $R^2$, $R^3$, $R^4$ or $R^5$ are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^1$ through $R^5$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^1$ through $R^5$ are aryl, the aryl group will generally contain from 6 to 10 carbon atoms (e.g., phenyl, naphthyl).

When one or more of $R^1$ through $R^5$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^1$ through $R^5$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^1$ and $R^5$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^1$ through $R^5$ are heterocyclic, the heterocyclic group generally consists of a compound having at least one ring of 6 to 12 members in which on one more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

$$R^1-\underset{\underset{R^2}{|}}{C}=\underset{\underset{R^3}{|}}{C}-\underset{\underset{O}{\|}}{C}-OR^4 \quad (VIII)$$

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate compounds of formula VIII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

$$R^1-\underset{\underset{R^2}{|}}{C}=\underset{\underset{R^3}{|}}{C}-\underset{\underset{O}{\|}}{C}-SR^4 \quad (IX)$$

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate thioesters of formula IX are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

$$R^1-\underset{\underset{R^2}{|}}{C}=\underset{\underset{R^3}{|}}{C}-\underset{\underset{O}{\|}}{C}-NR^4(R^5) \quad (X)$$

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated carboxyamides of formula X are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

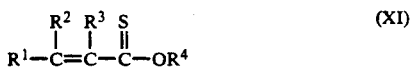

wherein $R^1$, $R^2$, $R^3$, and $R^4$ are the same or different and are hydrogen or substituted or unsubstituted hydrocarbyl as defined above. Examples of alpha, beta-ethylenically unsaturated thiocarboxylate compounds of formula XI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

wherein $R^1$, $R^2$, $R^3$, and $R^4$ are the same or different and are hydrogen or substituted or unsubstituted hydrocarbyl as defined above. Examples of alpha, beta-ethylenically unsaturated dithioic acids and acid esters of formula XII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

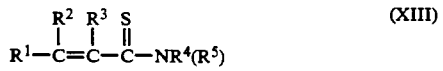

wherein $R^1$, $R^2$, $R^3$, and $R^4$ and $R^5$ are the same or different and are hydrogen or substituted or unsubstituted hydrocarbyl as defined above. Examples of alpha, beta-ethylenically unsaturated thiocarboxyamides of formula XIII are 2-butenthioamide, 2-hexenthioamide, 2-decenthioamide, 3-methyl-2-heptenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^3$ is hydrogen or a $C_1$ to $C_4$ alkyl group, such as methyl, and $R^4$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. e.g., propyl acrylate and propyl methacrylate In the preferred embodiments these compounds are acrylic and methacrylic esters such as methyl or ethyl acrylate, methyl or ethyl methacrylate When the selected alpha, beta-unsaturated compound comprises a compound of formula I wherein X is oxygen, the resulting reaction product with the polyamine contains at least one amido linkage (—C(O)N<) and such materials are herein termed "amidoamines." Similarly, when the selected alpha, beta unsaturated compound of formula I comprises a compound wherein X is sulfur, the resulting reaction product with the polyamine contains thioamide linkage (—C(S)N<) and these materials are herein termed "thioamidoamines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula I tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10-300%, or greater, for example, 25-200%, is employed. For more efficient cross-linking an excess of carboxylated material should preferably be used since a cleaner reaction ensues. For example, a molar excess of about 10-100% or greater such as 10-50%, but preferably an excess of 30-50%, of the carboxylated material. Larger excess can be employed if desired.

In summary, without considering other factors, equimolar amounts of reactants tend to produce a more linear amido-amine whereas excess of the formula I reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula:

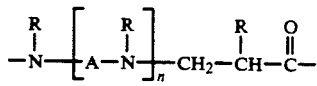

wherein the R's, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and n is an integer such as 1-10 or greater. The amido-amine adducts preferably contain an average of from 1 to 3 amido groups per molecule of the amido-amine adduct.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines of this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula I are contacted in an amount of from about 1 to 10, more preferably from about 2 to 6, and most preferably from about 3 to 5, equivalents of primary amine in the polyamine reactant per mole of the unsaturated reactant of formula I.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula IX liberates the corresponding $HSR^4$ compound (e.g., $H_2S$ when $R^4$ is hydrogen) as a by-product, and the reaction of an ethylenically unsaturated carboxyamide of formula X liberates the corresponding $HNR^4(R^5)$ compound (e.g., ammonia when $R^4$ and $R^5$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

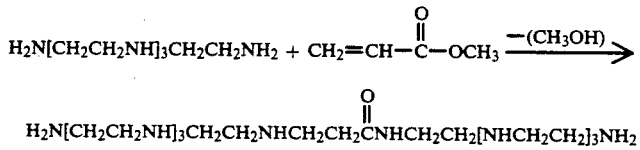

$$H_2N[CH_2CH_2NH]_3CH_2CH_2NHCH_2CH_2\overset{O}{\overset{\|}{C}}NHCH_2CH_2[NHCH_2CH_2]_3NH_2$$

PREPARATION OF REACTANT B

As indicated above, the fuel dispersant materials of this invention can be prepared by reacting the amidoamine A with a hydrocarbyl-substituted acid, anhydride or ester material. The long chain hydrocarbyl polymer-substituted mono- or dicarboxylic acid material, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono-or di-esters of (i); (iii) monounsaturated $C_3$ to $C_{10}$ monocarboxylic acid wherein the carbon-carbon double bond is conjugated to the carboxy group, i.e, of the structure

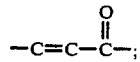

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined here in as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.3, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants to form reactant A are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight The olefin polymers used in the formation of reactant B will have number average molecular weights within the range of about 300 to 10,000, generally from about 700 and about 5,000, preferably from about 1000 to 4,000, more preferably between about 1300 and about 3,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e. $\overline{M}_w/\overline{M}_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of reaction products, particularly when employing maleic anhydride as the unsaturated acid reactant, with decreased sediment In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant and halogen (e.g., chlorine gas), where employed, are contacted for a time and under conditions effective to form the desired polymer substituted mono- or dicarboxylic acid material. Generally, the polymer and monounsaturated carboxylic reactant will be contacted in a unsaturated carboxylic reactant to polymer mole ratio usually from about 0.7:1 to 4:1, and preferably from about 1:1 to 2:1, at an elevated temperature, generally from about 120° to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g. polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

PREPARATION OF THE DISPERSANT

The amido-amine is readily reacted with the selected polymer substituted mono- or dicarboxylic acid material, e.g. alkenyl succinic anhydride, by heating an oil solution containing 5 to 95 wt. % of the polymer substituted dicarboxylic acid material to about 100° to 250° C., preferably 125° to 175° C., generally for 1 to 10, e.g. 2 to 6 hours until the desired amount of water is removed. The heating is preferably carried out to favor formation of imides and/or amides, rather than salts. Generally from 1 to 5, preferably from about 1.5 to 3 moles of mono- or dicarboxylic acid moiety content (e.g., grafted maleic anhydride or acrylic acid content) is used per equivalent of amido-amine reactant, e.g., amine.

An example of the reaction of an amido-amine reactant with a polymer dicarboxylic acid producing reactant is the reaction of polyisobutylene succinic anhydride (PIBSA) with a poly amido-amine having two terminal —$NH_2$ groups, which can be illustrated as follows:

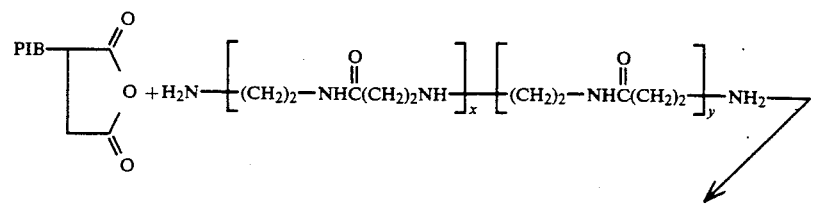

-continued

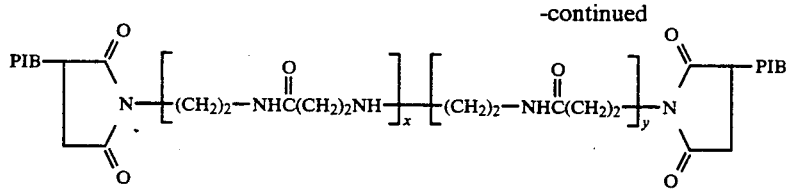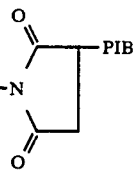

wherein x is an integer of from 0 to 10 and y is an integer of from 1 to 10, with the proviso that the sum of x+y is at least 1, e.g., 1 to 20.

An example of the reaction of an amido-amine reactant with a polymer-substituted monocarboxylic acid producing reactant is the reaction of polyisobutylene propionic acid (PIBA) with a poly amido-amine having two terminal —NH$_2$ groups, which can be illustrated as follows:

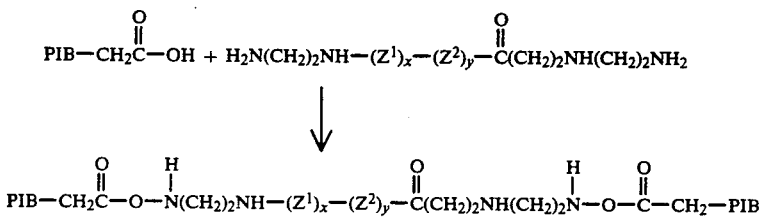

wherein x and y are each integers of from 0 to 10, with the proviso that the sum of x+y is at least 1, e.g., 1 to 20 and wherein $Z^1$ and $Z^2$ are the same or different and are each moieties of the formula:

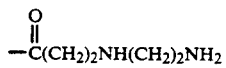

It will be understood that the amido-amine reactant A can be employed alone or in admixture with any of the above described amines, such as the polyalkylene polyamines, useful in preparing the amido-amine reactant.

Preferably, the polymer substituted mono- or dicarboxylic acid producing material and amido-amine will be contacted for a time and under conditions sufficient to react substantially all of the primary nitrogens in the amido-amine reactant The progress of this reaction can be followed by infrared analysis.

The dispersant-forming reaction can be conducted in a polar or non-polar solvent (e.g., xylene, toluene, benzene and the like), and is preferably conducted in the presence of a mineral or synthetic lubricating oil.

The nitrogen-containing dispersant materials of the instant invention as described above can be post-treated by contacting said nitrogen-containing dispersant materials with one or more post-treating reagents selected from the group consisting of carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

Since post-treating processes involving the use of these post-treating reagents is known insofar as application to high molecular weight nitrogen containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663; 3,652,616; UK Pat. No. 1,085,903; UK Pat. No. 1,162,436; U.S. Pat. No. 3,558,743.

The nitrogen containing dispersant materials of this invention can also be treated with polymerizable lactones (such as epsilon-caprolactone) to form dispersant adducts having the moiety —[C(O)(CH$_2$)$_z$O]$_m$H, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

The reactions of such lactones with dispersant materials containing nitrogen or ester groups is more completely described in copending applications Ser. Nos. 916,108; 916,217; 916,218; 916,287; 916,303; 916,113; and 916,114, all filed on Oct. 7, 1986; and co-pending Ser. No. 178,099 filed on Apr. 6, 1988; the disclosure of each of which is hereby incorporated by reference in its entirety.

The nitrogen-containing dispersant materials of this invention can also be post-treated by reaction with an alkyl acetoacetate or alkyl thioacetate of the formula:

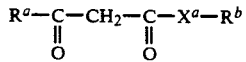

wherein $X^a$ is O or S, Rb is H or Ra, and Ra is in each instance in which it appears independently selected from the group consisting of substituted and unsubstituted alkyl or aryl (preferably alkyl of 1 to 6 carbon atoms, e.g., methyl, ethyl, etc.) to form an amino compound N-substituted by at least one tautomeric substituent of the formula:

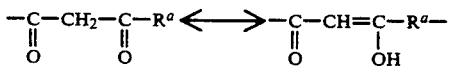

wherein $R^9$ is as defined above.

The reaction is preferably effected at a temperature sufficiently high so as to substantially minimize the production of the enaminone and produce, instead, the keto-enol tautomer. Temperatures of at least about 150° C. are preferred to meet this goal although proper choice of temperature depends on many factors, including reactants, concentration, reaction solvent choice, etc. Temperatures of from about 120° C. to 220° C., preferably from about 150° C. to 180° C. will generally be used. The reaction of the nitrogen-containing dispersant material and the alkyl acetonate and the alkyl thioacetate will liberate the corresponding $HOR^b$ and $HSR^b$ by-products, respectively. Preferably, such by-products are substantially removed, as by distillation or stripping with an inert gas (such as $N_2$), prior to use of the thus prepared dispersant adduct. Such distillation and stripping steps are conveniently performed at elevated temperature, e.g., at the selected reaction temperature (for example, at 150° C. or higher). A neutral diluent such as mineral oil may be used for the reaction.

The amount of alkyl aceto-acetate and/or alkyl thioacetate reactants used can vary widely, and is preferably selected so as to avoid substantial excesses of these reactants. Generally, these reactants are used in a reactant:amine nitrogen-equivalent molar ratio of from about 0.1 to 1:1, and preferably from about 0.5 to 1:1, wherein the moles of amine nitrogen-equivalent is the moles of secondary nitrogens plus twice the moles of primary nitrogens in the nitrogen-containing dispersant material (e.g., polyisobutenyl succinimide) which is thus contacted with the alkylacetonate or alkyl thioacetate. The reaction should also be conducted in the substantial absence of strong acids (e.g., mineral acids, such as HCl, $HB_2$, $H_2SO_4$, $H_3PO_3$ and the like, and sulfonic acids, such as para-toluene sulfonic acids) to avoid the undesired side-reactions and decrease in yield to the adducts of this invention.

The reactions of such alkyl acetoacetates and thioacetoacetates with nitrogen-containing dispersant materials is more completely described in copending application Ser. No. 51,276, filed May 18, 1987, the disclosure of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

The dispersant-forming reaction can be conducted in a polar or non-polar solvent (e.g., xylene, toluene, benzene and the like), and is preferably conducted in the presence of a mineral or synthetic lubricating oil.

The nitrogen containing dispersants can be further treated by boration as generally taught in U.S. Pat. Nos. 3,087,936 and 3,254,025 (incorporated herein by reference thereto) This is readily accomplished by treating the selected acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 20 atomic proportions of boron for each atomic proportion of nitrogen of said acylated nitrogen composition. Usefully the dispersants of the inventive combination contain from about 0.05 to 2.0 wt. %, e.g. 0.05 to 0.7 wt. % boron based on the total weight of said borated acyl nitrogen compound. The boron, which appears to be in the product as dehydrated boric acid polymers (primarily $(HBO_2)_3$), is believed to attach to the dispersant imides and diimides as amine salts, e.g., the metaborate salt of said diimide.

Treating is readily carried out by adding from about 0.05 to 4, e.g. 1 to 3 wt. % (based on the weight of said acyl nitrogen compound) of said boron compound, preferably boric acid which is most usually added as a slurry to said acyl nitrogen compound and heating with stirring at from about 135° C. to 190, e.g. 140°–170° C., for from 1 to 5 hours followed by nitrogen stripping at said temperature ranges. Or, the boron treatment can be carried out by adding boric acid to the hot reaction mixture of the monocarboxylic acid material and amine while removing water.

The ashless dispersants of this invention can be used alone or in admixture with other dispersants such as esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene diamine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals Mixtures of the above illustrated esters likewise are contemplated within the scope of this invention.

The ester dispersant may be prepared by one of several known methods as illustrated for example in U.S. Pat. No. 3,381,022. The ester dispersants may also be borated, similar to the nitrogen containing dispersants, as described above.

Hydroxyamines which can be reacted with the aforesaid long chain hydrocarbon substituted dicarboxylic acid materials to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1, 3-propanediol, N-(beta-hydroxy-propyl)-N'-(beta-aminoethyl-piperazine, tris(hydroxymethyl) amino-methane (also known as trismethylolaminomethane), 2-amino-1-butanol, ethanolamine, beta-(beta-hydroxyethoxy)ethylamine, and the like. Mixtures of these or similar amines can also be employed. The above description of nucleophilic reactants suitable for reaction with the hydrocarbyl substituted dicarboxylic acid or anhydride includes amines, alcohols, and compounds of mixed amine and hydroxy containing reactive functional groups, i.e., amino-alcohols.

The tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

Other dispersants which can be employed in admixture with the novel amido-amine dispersants of this invention are those derived from the aforesaid long chain hydrocarbyl substituted dicarboxylic acid material and the aforesaid amines, such as polyalkylene polyamines, e.g., long chain hydrocarbyl substituted succinimides Exemplary of such other dispersants are those described in co-pending Ser. No. 95,056, filed Sept. 9, 1987.

A preferred group of ashless dispersants are those derived from polyisobutylene substituted with succinic anhydride groups and reacted with amido-amine adducts formed by reacting polyethylene amines, e.g., tetraethylene pentamine, pentaethylene hexamine, polyoxyethylene and polyoxypropylene amines, e.g., polyoxypropylene diamine, trismethylolaminomethane and pentaerythritol, and combinations thereof, with an acrylate-type compound of formula (XIV) above. One particularly preferred dispersant combination involves a polyisobutene substituted with succinic anhydride groups and reacted with an amido-amine adduct which has been formed by the reaction of (1) a polyalkylene polyamine and (2) an acrylate-type reactant selected from the group consisting of lower alkyl alky-acrylates (e.g., methyl, ethyl, iso-propyl, propyl, iso-butyl, n-butyl, tert-butyl, etc., esters of methacrylic acid, acrylic acid, and the like).

The dispersants of the present invention can be incorporated into a fuel in any convenient way. Thus, these mixtures can be added directly to the fuel by dispersing or dissolving the same in the fuel at the desired level of concentration of the dispersant. Such blending into the additional fuel can occur at room temperature or elevated temperatures. Alternatively, the dispersants can be blended with a suitable oil-soluble solvent/diluent (such as benzene, xylene, toluene, lubricating base oils and petroleum distillates, including the various normally liquid fuels described in detail below) to form a concentrate, and then blending the concentrate with a fuel to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

FUEL COMPOSITIONS

When the dispersants of this invention are used in normally liquid petroleum fuels such as middle distillates boiling from about 65° to 430° C., including motor gasolines, kerosene, diesel fuels, home heating fuel oil, jet fuels, etc., a concentration of the additive in the fuel in the range of typically from about 0.001 to about 0.5, and preferably 0.005 to about 0.1 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103.

The distillate fuel oils will generally boil within the range of about 120° C. to about 500° C., e.g. 150° to about 400° C. The fuel oil can comprise atmospheric distillate or vacuum distillate, or cracked gas oil or a blend in any proportion of straight run and thermally and/or catalytically cracked distillates, etc. The most common petroleum distillate fuels are kerosene, jet fuels, diesel fuels and heating oils. The heating oil may be a straight atmospheric distillate, or it may frequently contain minor amounts, e.g. 0 to 35 wt. %, of vacuum gas oil and/or of cracked gas oils.

Oil soluble, as used herein, means that the additives are soluble in the fuel at ambient temperatures, e.g., at least to the extent of about 0.1 wt. % additive in the fuel oil at 25° C.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl-4-methylphenol, rust inhibitors, bacteriostatic agents, gum inhibitors, metal deactivators, upper cylinder lubricants and the like.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. In the Examples, SA:PIB ratios are based upon the total PIB charged to the reactor as starting material, i.e., both the PIB which reacts and the PIB which remains unreacted.

PREPARATION OF POLYISOBUTYLENE SUCCINIC ANHYDRIDE (PIBSA)

EXAMPLE 1

A polyisobutenyl succinic anhydride having a succinic anhydride (SA) to polyisobutenylene mole ratio (i.e., a SA:PIB ratio) of 1.04 is prepared by heating a mixture of 100 parts of polyisobutylene (940 $\overline{M}_n/\overline{M}_n=2.5$) with 13 parts of maleic anhydride to a temperature of about 220° C. When the temperature reaches 120° C., the chlorine addition is begun and 10.5 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 112. The PIBSA product is 90 wt. active ingredient (A.I.), the remainder being primarily unreacted PIB.

EXAMPLE 2

A polyisobutenyl succinic anhydride (PIBSA) having a SA:PIB ratio of 1.24, is prepared by heating a mixture of 100 parts of polyisobutylene (1320 $\overline{M}_n$; $\overline{M}_n/\overline{M}_n=2.5$) with 11 parts of maleic anhydride to a temperature of about 220° C. When the temperature reaches 120° C., the chlorine addition is begun and 10 parts of chlorine at a constant rate are added to the hot mixture for about 5 hours. The reaction mixture is then heat soaked at 220° C. for about 1.5 hours and then stripped with nitrogen for about one hour. The resulting polyisobutenyl succinic anhydride was diluted with S150 mineral oil to obtain a product having an ASTM Saponification Number of 69. The PIBSA product is 59 wt. % active ingredient (A.I.), the remainder being primarily unreacted PIB and mineral oil.

EXAMPLE 3

A polyisobutenyl succinic anhydride having a SA:-PIB ratio of 1.13 is prepared by heating a mixture of 100 parts of polyisobutylene (2225 $\overline{M}_n$; $\overline{M}_n/\overline{M}_n=2.5$) with 6.11 parts of maleic anhydride to a temperature of about 220° C. When the temperature reaches 120° C., the chlorine addition is begun and 5.07 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 54. The PIBSA product is 80 wt. % active ingredient (A.I.), the remainder being primarily unreacted PIB.

Preparation of Dispersants

A series of dispersants were prepared by reacting the selected PIBSA, prepared as in Examples 1-3 above, with one of two amido-amines or with a polyalkylene polyamine, tetraethylene pentamine (TEPA). Amido-amine I is prepared by reacting TEPA with methyl acrylate at a 2:1 TEPA:methyl acrylate molar ratio, to form a product mixture having 30.1 wt. % total N, 8.2 wt. % primary N, and containing about 50 wt. % unreacted TEPA. Amido-amine II is prepared similarly, except that a 1.5:1 TEPA:methyl acrylate molar ratio is employed, to form a product mixture containing 28.3 wt. % total N, 6.1 wt. % primary N, and about 25 wt. % unreacted TEPA.

The amination reactions were carried out as follows:

EXAMPLE 4

A mixture of 200 parts by weight of the PIBSA product formed in Example 1 and 188 parts of S150 mineral oil was heated to 150° C. under $N_2$. Then 32.3 parts of amido-amine I were added dropwise while stirring and light nitrogen sparging. The mixture was nitrogen stripped at 150° C. for 3 hours and then filtered. The oil solution was found to have the nitrogen content of 2.37 wt % and a kinematic viscosity of 107.4 cSt at 100° C.

EXAMPLE 5

A mixture of 200 parts by weight of the PIBSA product formed in Example 1 and 200 parts of S150 mineral oil was heated to 150° C. under $N_2$. Then 43.4 parts of amido-amine II were added dropwise while stirring and light nitrogen sparging. The mixture was nitrogen stripped at 150° C. for 3 hours and then filtered. The oil solution was found to have the nitrogen content of 2.86 wt % and a kinematic viscosity of 135.7 cSt at 100° C.

EXAMPLE 6

A mixture of 200 parts by weight of the PIBSA product formed in Example 2 and 55 parts of S150 mineral oil was heated to 150° C. under $N_2$. Then 21 parts of amido-amine I were added dropwise while stirring and light nitrogen sparging. The mixture was nitrogen stripped at 150° C. for 3 hours and then filtered. The oil solution was found to have the nitrogen content of 2.39 wt % and a kinematic viscosity of 220.8 cSt at 100° C.

EXAMPLE 7

A mixture of 200 parts by weight of the PIBSA product formed in Example 2 and 62 parts of S150 mineral oil was heated to 150° C. under $N_2$. Then 28.2 parts of amido-amine II were added dropwise while stirring and light nitrogen sparging. The mixture was nitrogen stripped at 150° C. for 3 hours and then filtered The oil solution was found to have the nitrogen content of 2.86 wt % and a kinematic viscosity of 207.4 cSt at 100.C.

A mixture of 200 parts by weight of the PIBSA product formed in Example 3 and 126 parts of S150 mineral oil was heated to 150° C. under $N_2$. Then 15.9 parts of amido-amine I were added dropwise while stirring and light nitrogen sparging. The mixture was nitrogen stripped at 150° C. for 3 hours and then filtered. The oil solution was found to have the nitrogen content of 1.51 wt % and a kinematic viscosity of 494.1 cSt at 100° C.

EXAMPLE 9

A mixture of 200 parts by weight of the PIBSA product formed in Example 3 and 132 parts of S150 mineral oil was heated to 150° C. under $N_2$. Then 21.3 parts of amido-amine II were added dropwise while stirring and light nitrogen sparging. The mixture was nitrogen stripped at 150° C. for 3 hours and then filtered. The oil solution was found to have the nitrogen content of 1.83 wt % and a kinematic viscosity of 484.2 cSt at 100° C.

COMPARATIVE EXAMPLE A

A mixture of 200 parts by weight of the PIBSA product formed in Example 1 and 174.5 parts of S150 mineral oil was heated to 150° C. under $N_2$. Then 17.9 parts of tetraethylenepentaamine were added dropwise while stirring and light nitrogen sparging. The mixture was nitrogen stripped at 150° C. for 3 hours and then filtered. The oil solution was found to have the nitrogen content of 1.72 wt % and a kinematic viscosity of 156.3 cSt at 100° C.

COMPARATIVE EXAMPLE B

A mixture of 200 parts by weight of the PIBSA product formed in Example 2 and 42 parts of S150 mineral oil was heated to 150° C. under $N_2$. Then 11.6 parts of tetraethylenepentaamine were added dropwise while stirring and light nitrogen sparging. The mixture was nitrogen stripped at 150° C. for 3 hours and then filtered. The oil solution was found to have the nitrogen content of 1.65 wt % and a kinematic viscosity of 213.0 cSt at 100° C.

COMPARATIVE EXAMPLE C

A mixture of 200 parts by weight of the PIBSA product formed in Example 3 and 119 parts of S150 mineral oil was heated to 150° C. under $N_2$. Then 8.8 parts of tetraethylenepentaamine were added dropwise while stirring and light nitrogen sparging. The mixture was nitrogen stripped at 150° C. for 3 hours and then filtered. The oil solution was found to have the nitrogen content of 1.05 wt % and a kinematic viscosity of 487.8 cSt at 100° C.

The product dispersants thereby obtained are summarized as set forth in Table I below.

TABLE I

| Example No. | PIB Mn | Amine | % N | VIS 100° C. cSt |
|---|---|---|---|---|
| 4 | 940 | Amido-amine I | 2.37 | 107.4 |
| 5 | 940 | Amido-amine II | 2.86 | 135.2 |
| Compar. A | 940 | TEPA | 1.72 | 156.3 |
| 6 | 1300 | Amido-amine I | 2.39 | 220.8 |
| 7 | 1300 | Amido-amine II | 2.86 | 207.4 |
| Compar. B | 1300 | TEPA | 1.65 | 213.0 |
| 8 | 2250 | Amido-amine I | 1.51 | 494.1 |
| 9 | 2250 | Amido-amine II | 1.83 | 484.2 |
| Compar. C | 2250 | TEPA | 1.05 | 487.8 |

EXAMPLE 10

A mixture of 1551 parts by weight of the PIBSA product formed in Example 3 and 1181 parts of S150 mineral oil was heated to 150° C. under $N_2$. Then 150 parts of amido-amine II were added dropwise while stirring and light nitrogen sparging. The mixture was nitrogen stripped at 150° C. for 3 hours and then filtered. The oil solution was found to have the nitrogen content of 1.51 wt % and a kinematic viscosity of 473.4 cSt at 100° C.

COMPARATIVE EXAMPLE D

A mixture of 1800 parts by weight of the PIBSA product formed in Example 3 and 1163 parts of S150 mineral oil was heated to 150° C. under $N_2$. Then 94 parts of tetraethylenepentaamine were added dropwise while stirring and light nitrogen sparging for 1 hour. The mixture was nitrogen stripped at 150° C. for 1.5 hours. 39.5 parts of boric acid are added over 1.5 hours while stirring at 163° C. followed by $N_2$ stripping for 2 hours, cooling and filtering. The oil solution was found to have the nitrogen content of 0.97 wt %, a boron content of 0.28 wt % and a kinematic viscosity of 896 cSt at 100° C.

EXAMPLE 11

Preparation of Amido Amine.

To a stirred reaction vessel was added 1.5 moles of tetraethylenepentamine (TEPA) at room temperature, followed by 1 mole of ethyl acrylate, under a $N_2$ blanket. The resulting exothermic reaction raised the reaction mass, temperature to about 75° C. Then an infra-red analysis (IR) was made of the reaction mass, which showed the disappearance of the double bond of the ethyl acrylate, but revealed ester groups to be still present. A gas chromatographic analysis of the reaction mass was also then taken, which showed unreacted TEPA still present.

An esterification catalyst, stannous octanoate, was then added (1 drop) to the reaction mass, and the temperature of the reaction vessel was increased to 130° to 135° C. with mild $N_2$ sweeping. The by-product alcohol (ethanol) was removed as a vapor from the reaction vessel with the sweep $N_2$, and the progress of the reaction was followed by IR until the ester absorption band disappeared. The reaction mass was stirred for additional 1 hour at 130° to 135° C. to ensure completion of the reaction. A total reaction time of 6 hours was used. The resulting product mixture containing the amido-amine was analyzed and was found to contain 4.8 milliequivalents of primary amine per gram of amido-amine and a nitrogen content of 30.1 wt %.

EXAMPLE 12

The procedure of Example 11 was repeated except that the esterification catalyst comprised titanium tetrabutoxide, and similar results were obtained.

EXAMPLE 13

A series of gasolines are prepared having a Reid vapor pressure of 8.4 psi and containing the indicated amounts of the dispersant product mixtures prepared as described above:

TABLE A

| Gasoline Composition | Dispersant Ex. No.: | (wt %) |
|---|---|---|
| A | 4 | 0.002 |
| B | 5 | 0.02 |
| C | 6 | 0.008 |
| D | 7 | 0.1 |
| E | 8 | 0.3 |
| F | 9 | 0.015 |
| G | 4 | 0.001 |
| H | 11 | 0.09 |
| I | 12 | 0.005 |
| J | 11 | 0.05 |

EXAMPLE 14

A series of diesel fuels are prepared containing the indicated amounts of the dispersant product mixtures prepared as described above:

TABLE B

| Diesel Fuel Composition | Dispersant Ex No. | (wt %) |
|---|---|---|
| A | 4 | 0.002 |
| B | 5 | 0.02 |
| C | 6 | 0.008 |
| D | 7 | 0.1 |
| E | 8 | 0.3 |
| F | 9 | 0.015 |
| G | 4 | 0.001 |
| H | 11 | 0.09 |
| I | 12 | 0.005 |
| J | 11 | 0.05 |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for producing a dispersant useful as an oil additive which comprises:
   (a) providing a long chain hydrocarbyl substituted mono- or dicarboxylic acid producing material formed by reacting an olefin polymer of $C_2$ to $C_{10}$ monoolefin having a number average molecular weight of about 300 to 10,000 and at least one of a $C_4$ to $C_{10}$ monounsaturated dicarboxylic acid material and a $C_3$ to $C_{10}$ monounsaturated monocarboxylic acid material, said acid producing material having an average of at least about 0.3 dicarboxylic acid producing moieties, per molecule of said olefin polymer present in the reaction mixture used to form said acid producing material;
   (b) providing an amido-amine compound having at least one primary amino group prepared by reacting at least one polyamine with at least one alpha, beta-unsaturated compound of the formula:

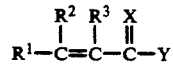

wherein X is sulfur or oxygen, Y is $-OR^4, -SR^4$, or $-NR^4(R^5)$, and $R^1$, $R^2$, $R^3$, $R^4$ and $R^5$ are the same or different and are hydrogen or substituted or unsubstituted hydrocarbyl; and
   (c) contacting the said acid producing material with said amido-amine compound under conditions sufficient to effect reaction of at least a portion of the primary amino groups on said amido-amine compound with at least a portion of the acid-producing groups in said acid producing material, to form said dispersant.

2. The process according to claim 1 wherein said polyamine comprises amines containing from 2 to 60 carbon atoms and from 2 to 12 nitrogen atoms per molecule.

3. The process according to claim 2, wherein said polyamine comprises a polyalkylenepolyamine wherein each said alkylene group contains from 2 to 40 carbons and said polyalkylenepolyamine contains from 5 to about 9 nitrogen atoms per molecule.

4. The process according to claim 1, wherein said hydrocarbyl substituted acid producing material comprises a hydrocarbyl substituted $C_4$ to $C_{10}$ monounsaturated dicarboxylic acid producing material which comprises polyisobutylene of about 900 to 5000 number average molecular weight substituted with succinic anhydride moieties, said amine comprises polyalkylenepolyamine wherein each said alkylene group contains from 2 to 6 carbons and said polyalkyenepolyamine contains from 5 to 9 nitrogen atoms per molecule, and an acrylate-type compound comprising at least one member selected from the group consisting of methyl acrylate, ethyl acrylate, propyl acrylate, butyl acrylate, methyl methacrylate, ethyl methacylate, propyl methacrylate, and butyl methacrylate.

5. The process according to claims 1 or 4, wherein said polyamine comprises polyethylenepolyamine.

6. The process according to claims 1 or 4, wherein said dispersant is borated to provide from about 0.05 to 2.0 weight percent boron in said borated dispersant.

7. The process according to claim 1, wherein the ratio of acid producing moieties per molecule of olefin polymer in said dispersant is from about 0.9 to 1.3

8. The process of claim 7, wherein said number average molecular weight of said fist olefin polymer is from about 1300 to 4,000.

9. The process of claim 8, wherein said monounsaturated acid material comprises maleic anhydride.

* * * * *